(12) United States Patent
Sugawara (10) Patent No.: US 6,590,714 B2
(45) Date of Patent: Jul. 8, 2003

(54) COLOR COMBINING OPTICAL SYSTEM AND PROJECTION TYPE DISPLAY APPARATUS HAVING THE SAME

(75) Inventor: Saburo Sugawara, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 09/924,013

(22) Filed: Aug. 7, 2001

(65) Prior Publication Data

US 2002/0057500 A1 May 16, 2002

(30) Foreign Application Priority Data

Aug. 9, 2000 (JP) ........................................ 2000-241430

(51) Int. Cl.[7] ........................ G02B 27/14; G03B 21/00; H04N 9/69; F21V 9/14
(52) U.S. Cl. ........................ 359/634; 359/618; 359/621; 359/630; 359/637; 359/640; 359/487; 353/31; 353/33; 348/757; 362/19
(58) Field of Search ..................... 359/618, 619, 359/620, 621, 622, 623, 629, 630, 631, 634, 638, 637, 639, 640; 353/31, 32, 33, 34, 37; 348/756, 757; 362/19, 331, 268

(56) References Cited

U.S. PATENT DOCUMENTS

| | | | | |
|---|---|---|---|---|
| 5,357,289 A | * | 10/1994 | Konno et al. | 348/757 |
| 5,658,060 A | * | 8/1997 | Dove | 353/33 |
| 5,944,401 A | * | 8/1999 | Murakami et al. | 353/33 |
| 5,973,840 A | * | 10/1999 | Itoh et al. | 359/618 |
| 5,978,136 A | * | 11/1999 | Ogawa et al. | 359/487 |
| 6,215,597 B1 | * | 4/2001 | Duncan et al. | 359/637 |
| 6,229,581 B1 | * | 5/2001 | Yamamoto et al. | 348/757 |
| 6,262,851 B1 | * | 7/2001 | Marshall | 359/634 |

FOREIGN PATENT DOCUMENTS

| | | |
|---|---|---|
| JP | 8-201756 | 8/1996 |
| JP | 11-231218 | 8/1999 |

* cited by examiner

Primary Examiner—Loha Ben
(74) Attorney, Agent, or Firm—Morgan & Finnegan, LLP (57) ABSTRACT

The present invention has as its object to provide a projection type display apparatus which suffers little from the occurrence of the distortion of the surface of a dichroic mirror in a color combining optical system, and the occurrence of the deformation of a projected image by the angular deviation of the surface of the dichroic mirror and in which the correction of the chromatic aberration of magnification of a projection lens is stably possible during mass production. So, the color combining system of the present invention is provided with at least three prisms, two dichroic mirror layers for reflecting lights differing in wavelength area from each other, the two dichroic mirror layers being formed so as not to intersect with each other with one of the three prisms which is located most adjacent to the light exit side interposed therebetween, and at least one optical element having positive or negative refractive power. The optical element receives light from at least one of a plurality of light modulating elements, and causes the light to enter one of the at least three prisms. The light exit surface of the prism located most adjacent to the light exit side serves also as a total reflection surface for reflecting the light to one of the two dichroic mirror layers.

26 Claims, 10 Drawing Sheets

COLOR COMBINING OPTICAL SYSTEM AND PROJECTION TYPE DISPLAY APPARATUS HAVING THE SAME

BACKGROUND OF THE INVENTION

1. Field of the Invention

This invention relates to a color combining optical system and a projection type display apparatus constituted by this color combining optical system, and more particularly to a projection type display apparatus for combining images modulated by three liquid crystal panels illuminated, for example, by lights of three primary colors, i.e., blue, green and red, and forming a color image on a screen, a wall or other surface capable of displaying.

2. Related Background Art

Heretofore, when the combination of three colors is to be effected by the use of a color combining prism and a projection lens, it has been difficult to make three projected images completely coincident with one another because there is the chromatic aberration of magnification of the projection lens. In view of such a problem, in Japanese Patent Application Laid-Open No. 8-201756, there is made a proposition changing the focal length or the disposed position of a field lens disposed between color combining means comprised of two dichroic mirrors and a reflecting mirror, and a liquid crystal panel discretely in each optical path to thereby make the chromatic aberration of magnification of a projection lens correctable. Likewise in Japanese Patent Application Laid-Open No. 11-231218, there is made a proposition for disposing a correction lens between a color combining prism comprised of a cross dichroic prism and a liquid crystal panel to thereby make the chromatic aberration of magnification of a projection lens correctable.

In the apparatus of the above-mentioned Japanese Patent Application Laid-Open No. 8-201756, however, two dichroic mirrors and a reflecting mirror are used as color combining means, and in addition to the chromatic aberration of magnification of the projection lens, the distortion of the surfaces of the dichroic mirrors and the distortion of a color channel transmitted through the surfaces of the dichroic mirrors by the dichroic mirrors occur and therefore, the size of the projected image of each channel has not become a size expected from calculation, and the aberration correction of each channel could not be effected well. Particularly, in a color channel using the reflecting surfaces of the dichroic mirrors, the change in the magnification of the projected image by the distortion of the surfaces of the dichroic mirrors is great, and when the distortion of the surfaces of the dichroic mirrors is asymmetrical, the projected image on a screen also assumes an asymmetrical shape correspondingly thereto and therefore, even if the focal length or the position of the field lens is changed discretely in each color channel, it has been difficult to superpose the projected images completely upon one another.

Also, in the apparatus of the above-mentioned Japanese Patent Application Laid-Open No. 11-231218, a cross dichroic prism comprised of four right-angled triangular pole prisms is used for color combining and therefore, in addition to the chromatic aberration of magnification of the projection lens, the surface of the dichroic mirror is bent by the angular error of the prism and therefore, the deformation of the projected images is added, and it has been difficult to superpose the projected images of three colors, i.e., red, green and blue, completely upon one another on a screen.

SUMMARY OF THE INVENTION

It is an object of the present invention to solve the above-noted problems and to provide a projection type display apparatus which suffers little from the occurrence of the distortion of the surface of a dichroic mirror in a color combining optical system and the occurrence of the deformation of a projected image by the angular deviation of the surface of the dichroic mirror and in which the correction of the chromatic aberration of magnification of a projection lens is stably possible during mass production.

In one aspect of the present invention, there is provided a color combining optical system which includes:

at least three prisms;

two dichroic mirror layers for reflecting lights differing in wavelength area from each other, the two dichroic mirror layers being formed so as not to intersect with each other with the prism adjacent to one of the three prisms which is located most adjacent to the light exit side interposed therebetween; and at least one optical element having positive or negative refractive power, the optical element receiving light from at least one of a plurality of light modulating elements, and causing the light to enter one of the at least three prisms;

wherein the light exit surface of the prism located most adjacent to the light exit side serves also as a total reflection surface for reflecting the light to one of the two dichroic mirror layers.

In another aspect of the present invention, there is provided a color combining optical system which includes:

at least three prisms; and two dichroic mirror layers for reflecting lights differing in wavelength area from each other, the two dichroic mirror layers being formed so as not to intersect with each other with the prism adjacent to one of the three prisms which is located most adjacent to the light exit side interposed therebetween;

wherein the light exit surface of the prism located most adjacent to the light exit side serves also as a total reflection surface for reflecting light to one of the two dichroic mirror layers, and at least one of the light incidence surfaces of the three prisms has positive or negative refractive power.

In another aspect of the present invention, there is provided a color combining optical system which includes:

at least three prisms; and two dichroic mirror layers for reflecting lights differing in wavelength area from each other, the two dichroic mirror layers being formed so as not to intersect with each other with the prism adjacent to one of the three prisms which is located most adjacent to the light exit side interposed therebetween;

wherein the light exit surface of the prism located most adjacent to the light exit side serves also as a total reflection surface for reflecting light to one of the two dichroic mirror layers, and the at least three prisms have therein an area having positive or negative refractive power.

In another aspect of the present invention, there is provided a color combining optical system which includes:

at least four prisms;

two dichroic mirror layers for reflecting lights differing in wavelength area from each other, the dichroic mirror layers being formed so as not to intersect with each other with a set of prisms adjacent to one of the four prisms which is located most adjacent to the light exit side interposed therebetween; and an optical element having positive or negative refractive power, the optical element receiving light from at least one of a plurality of light modulating means, and causing the light to enter one of the at least four prisms;

wherein the light exit surface of the prism located most adjacent to the light exit side serves also as a total reflection surface for reflecting the light to one of the two dichroic mirror layers.

In another aspect of the present invention, there is provided a color combining optical system which includes:

at least four prisms; and two dichroic mirror layers for reflecting lights differing in wavelength area from each other, the dichroic mirror layers being formed so as not to intersect with each other with a set of prisms adjacent to one of the four prisms which is located most adjacent to the light exit side interposed therebetween;

wherein the light exit surface of the prism located most adjacent to the light exit side serves also as a total reflection surface for reflecting the light to one of the two dichroic mirror layers, and at least one of the light incidence surfaces of the at least four prisms has positive or negative refractive power.

In another aspect of the present invention, there is provided a color combining optical system which includes:

at least four prisms; and two dichroic mirror layers for reflecting lights differing in wavelength area from each other, the two dichroic mirror layers being formed so as not to intersect with each other with a set of prisms adjacent to one of the four prisms which is located most adjacent to the light exit side interposed therebetween;

wherein the light exit surface of the prism located most adjacent to the light exit side serves also as a total reflection surface for reflecting the light to one of the two dichroic mirror layers, and the at least four prisms have therein an area having positive or negative refractive power.

In further aspect of the above-described optical system, on the premise that one of the four prisms which is located most adjacent to the light exit side is the first prism, the set of prisms are the second and third prisms as counted from the light exit side.

In further aspect of the above-described optical system, on the premise that one of the four prisms which is located most adjacent to the light exit side is the first prism, the second and third prisms as counted from the light exit side have positive or negative refractive power therebetween.

In further aspect of the above-described optical system, on the premise that one of the four prisms which is located most adjacent to the light exit side is the first prism, there is an optical element having positive or negative refractive power on the light incidence side of the second prism as counted from the light exit side.

In further aspect of the above-described optical system, on the premise that one of the four prisms which is located most adjacent to the light exit side is the first prism, there is an optical element having positive or negative refractive power on the light exit side of the third prism as counted from the light exit side.

In further aspect of the above-described optical system, on the premise that one of the four prisms which is located most adjacent to the light exit side is the first prism, a first dichroic mirror layer for reflecting a first color light is formed between the first and second prisms as counted from the light exit side, and a second dichroic mirror layer for reflecting a second color light is formed between the third and fourth prisms as counted from the light exit side.

In another aspect of the present invention, there is provided a projection type display apparatus which includes:

a plurality of light modulating means for modulating a plurality of color lights differing in wavelength area from one another;

color combining means for combining the plurality of color lights modulated by the light modulating means; and projecting means for enlarging and projecting the lights combined by the color combining means.

In further aspect of the above-described projection type display apparatus, the optical element having positive or negative refractive power or the incidence surfaces of the prisms having positive or negative refractive power are disposed between at least blue light modulating means of the plurality of light modulating means and the color combining optical system.

In further aspect of the above-described projection type display apparatus, the following conditional expression is satisfied:

$$0.03 < L/bf < 0.3,$$

where L: the air-converted interval between the display portion of the light modulating means and the principal point of the optical element having positive or negative refractive power;

bf: the back focal length of the projecting means on the reduction conjugate side thereof when the conjugate length of the projecting means on the enlargement conjugate side thereof is infinity.

In further aspect of the above-described projection type display apparatus, the following conditional expression is satisfied:

$$|fw/fc| < 0.03,$$

where fw: the focal length of the projecting means;

fc: the focal length of the optical element.

In another aspect of the present invention, there is provided a projection type display apparatus which includes:

a plurality of light modulating means for modulating a plurality of color lights differing in wavelength area from one another;

color combining means for combining the plurality of color lights modulated by the light modulating means; and projecting means for enlarging and projecting the lights combined by the color combining means.

In further aspect of the above-described projection type display apparatus, blue light modulating means of the plurality of light modulating means is disposed in opposed relationship with the light incidence surface of the prism located most adjacent to the light exit side.

In further aspect of the above-described projection type display apparatus, the following conditional expression is satisfied:

$$0.45 < L/bf < 0.8,$$

where L: the air-converted interval between the display portion of the light modulating means and the principal point of the optical element;

bf: the back focal length of the projecting means on the reduction conjugate side thereof when the conjugate length of the projecting means on the enlargement conjugate side thereof is infinity.

In further aspect of the above-described projection type display apparatus, the following conditional expression is satisfied:

$$|fw/fc|<0.015,$$

where fw: the focal length of the projecting means;

fc: the focal length of the optical element.

DESCRIPTION OF THE PREFERRED EMBODIMENTS

In the embodiments of the present invention, the above-described construction is applied, whereby it is not necessary to use a dichroic mirror of which the surface accuracy is difficult to well keep, and dichroic mirror layers intersecting with each other in a prism and therefore, there can be realized a color combining projection optical system which suffers little from the fluctuation of the magnification of each color channel attributable to the construction of a color combining optical system and which can effectively correct the chromatic aberration of magnification of a projection lens. Also, there can be realized a color combining projection optical system which suffers very little from a reduction in resolving power, as compared with the color combining projection optical system according to the prior art and therefore, the present invention is suitable for a liquid crystal projector or the like of which a high quality of image is required.

Some embodiments of the present invention will hereinafter be described.

Embodiment 1

Figure 1:
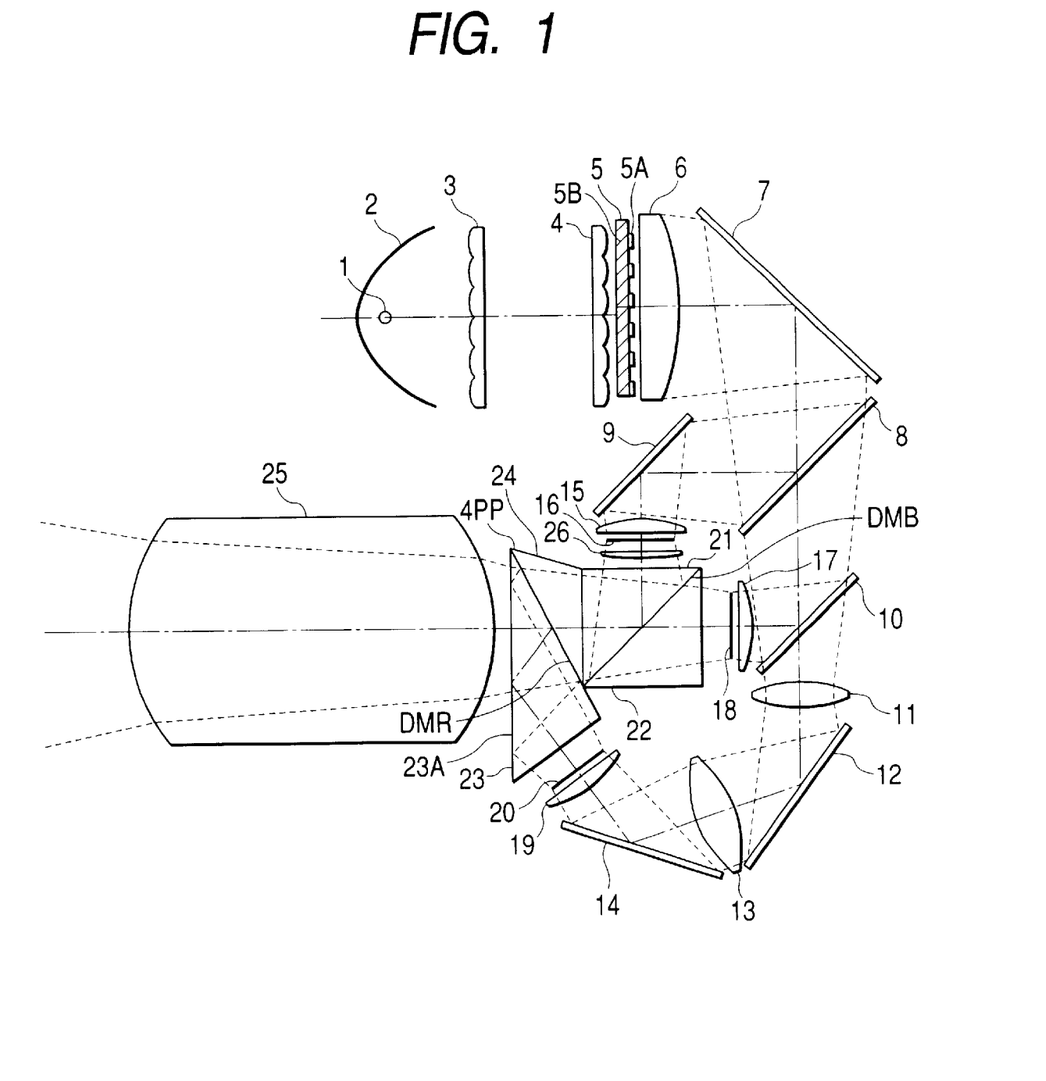
FIG. 1 is a cross-sectional view showing the construction of a projection type image display apparatus in Embodiment 1 of the present invention.

FIG. 1 is a cross-sectional view showing the construction of a projection type image display apparatus in Embodiment 1 of the present invention. In FIG. 1, a white light emitted from a light source 1 is converted into a substantially parallel light by a parabolic mirror 2, and this parallel light is condensed on the center of each lens of a second fly-eye lens 4 by a first fly-eye lens 3, and is converted into a polarized light in a direction by a polarization converting element 5. The light incident on the polarization converting element 5 is separated into a P wave and an S wave by the polarization separating layer 5B thereof, and the P wave is transmitted through the polarization separating layer 5B and the S wave is reflected by it, and the P wave is phase-converted by a λ/2 phase plate 5A and has the direction of its polarization axis made equal to that of the S wave.

Thereby, all the beams emerging from the polarization converting element 5 become polarized lights having polarization axes in the same direction.

Further, only a blue light is condensed on blue image modulating means 16 by a first condenser lens 6, a high reflection mirror 7, a blue reflecting dichroic mirror 8, a high reflection mirror 9 and a second positive lens 15.

Also, of the lights transmitted through the blue reflecting dichroic mirror 8, only a green light reflected by a green reflecting dichroic mirror 10 and condensed by a third positive lens 17 is condensed on green image modulating means 18.

A red light transmitted through the green reflecting dichroic mirror 10 is condensed on red image modulating means 20 by a fourth positive lens 11, a high reflection lens 12, a fifth positive lens 13, a high reflection lens 14 and a sixth positive lens 19. A blue image modulated by the blue image modulating means 16 is refracted by a seventh positive lens 26, is reflected by the blue reflecting dichroic mirror layer DMB of the prism 21 of a color combining prism 4PP, and is enlarged and projected onto a screen, not shown, by a projection lens 25 through a prism 24 and a prism 23.

A green image modulated by the green image modulating means 18 is enlarged and projected onto the screen, not shown, by the projection lens 25 through a prism 22, a prism 21, the prism 24 and the prism 23. A red image modulated by the red image modulating means 20 is totally reflected by the total reflection surface 23A of the prism 23, is reflected by the red reflecting dichroic mirror layer DMR of the prism 23, and is enlarged and projected onto the screen, not shown, by the projection lens 25.

In present-day ordinary projection lenses, the chromatic aberration of magnification of blue is particularly great and becomes over on the image plane and therefore, the projected image on the screen becomes small. Therefore, when a positive lens 26 is disposed between the blue image modulating means 16 and the color combining prism 4PP, the combined focal length of only a blue channel can be shortened and the projected image on the screen, not shown, can be made large and thus, the chromatic aberration of magnification of the projection lens 25 can be corrected.

Figure 4:
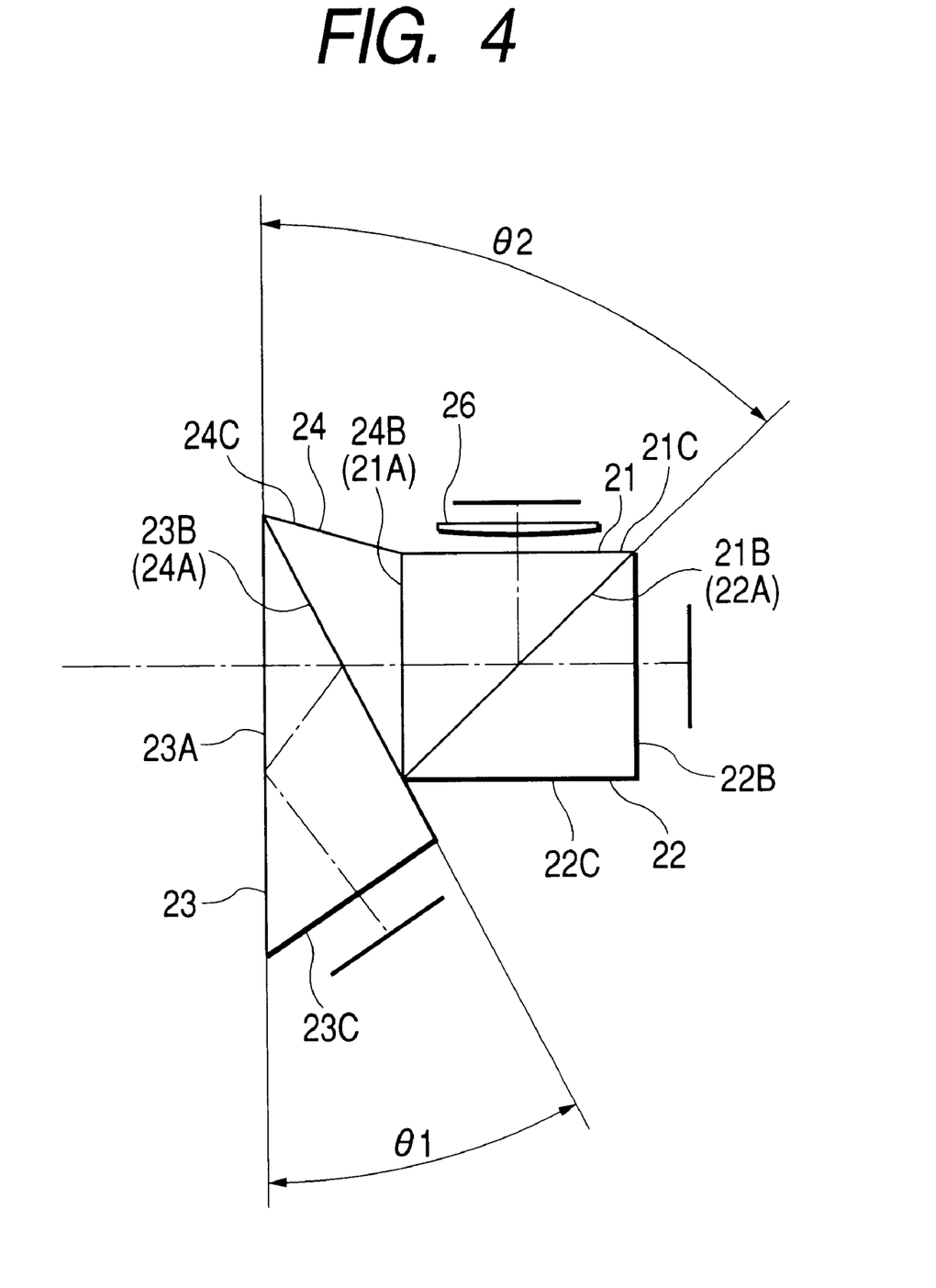
FIG. 4 is a cross-sectional view showing the construction of a color combining prism used in the projection type image display apparatus in Embodiment 1 of the present invention.

FIG. 4 is a cross-sectional view of the color combining prism used in the projection type image display apparatus of Embodiment 1

This color combining prism comprises, in succession from the exit side, a first prism 23 having a surface 23A of which the total reflection surface is common to the exit surface, a surface 23B on which a dichroic mirror layer for reflecting red is formed, and an incidence surface 23C, a second prism 24 having two transmitting surfaces 24A and 24B, a third prism 21 having an exit surface 21A, an incidence surface 21C and a surface 21B on which a blue reflecting dichroic mirror layer is formed, and a fourth prism 22 having an exit surface 22A and an incidence surface 22B, and these four prisms are joined together.

This color combining prism, as compared with a color separating prism comprised of three prisms used for the color separation of a video camera, realizes the shortening of the optical path length of the prism, because the prism sandwiched between the two dichroic mirror surfaces is divided into two prisms, whereby the eclipse of the effective beam by the exit side prism can be prevented and the incidence side prism can be made small.

Also, the angle $\theta 1$ formed by and between the exit surface 23A of the first prism and the surface 23B on which the dichroic mirror layer is formed is set to 27° so as to satisfy the total reflection condition of the exit surface 23A and so that the ghost by inner surface reflection may not occur on the surface 23B on which the dichroic mirror layer is formed.

Also, the angle $\theta 2$ formed by and between the dichroic mirror surface 21B formed in the boundary portion between the third prism 21 and the fourth prism 22 and the exit surface 23A of the first prism is set to 45° to minimize the optical path length of the prism.

Further, the refractive index of the prism is made higher than in the prior art, and the optical path length of the prism during air conversion is further shortened.

The color combining prism used in the present embodiment, unlike the prior-art color combination by the dichroic mirror, is a prism having a great glass thickness and therefore can keep the surface accuracy of the dichroic mirror layer good, and dichroic mirror layers do not intersect with each other in the prism as in the cross dichroic prism according to the prior art, and this leads to the advantage that even if the angular accuracy of the prism is bad, the deterioration of the quality of the projected image will scarcely occur.

Embodiment 2

Figure 2:
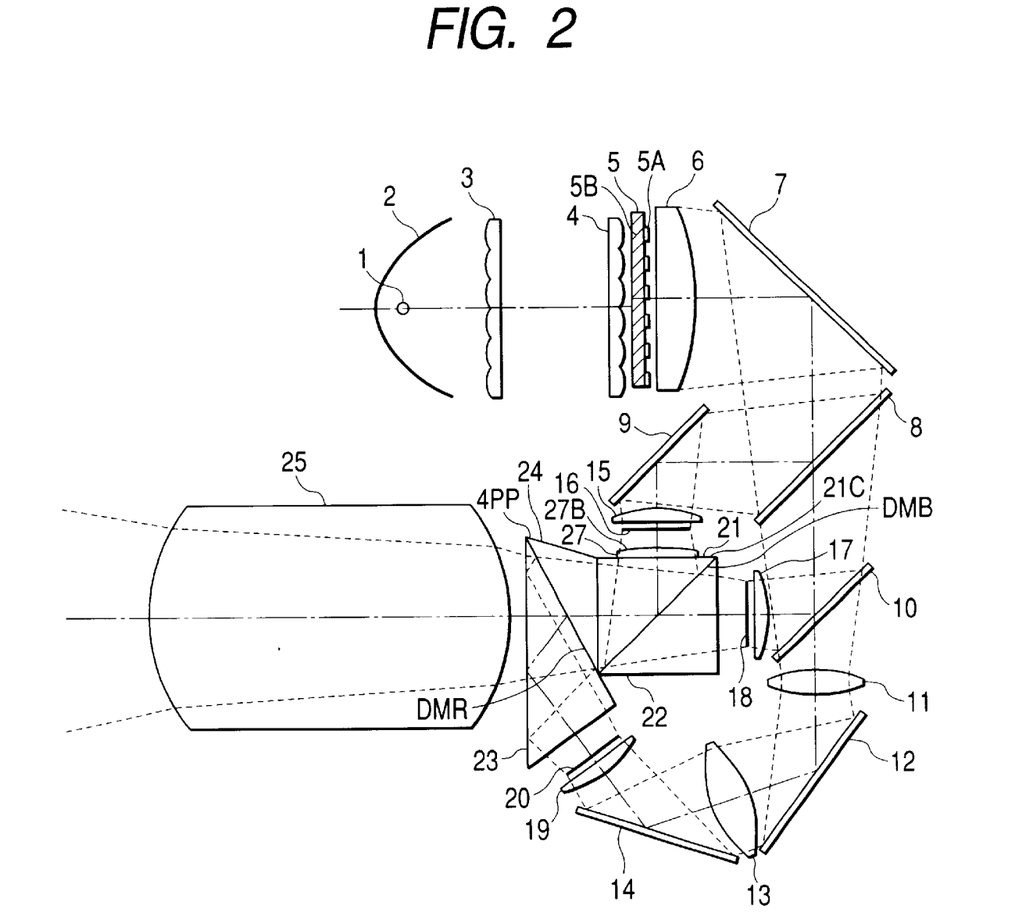
FIG. 2 is a cross-sectional view showing the construction of a projection type image display apparatus in Embodiment 2 of the present invention.

FIG. 2 is a cross-sectional view showing the construction of a projection type image display apparatus in Embodiment 2 of the present invention. This embodiment is constructed with an eighth positive lens 27 creating an effect similar to that of the seventh positive lens 26 in Embodiment 1 of FIG. 1 disposed between the blue image modulating means 16 and the color combining prism 4PP being joined to the incidence surface 21C of the prism 21.

Comparing the present embodiment with Embodiment 1, the surface of the prism 21 which faces the eighth positive lens 27 is a joined surface, and this leads to the advantage that an antireflection coat can be omitted. Also, as compared with Embodiment 1, the eighth positive lens 27 can be kept away from the blue image modulating means 16 and therefore, the power of the eighth positive lens 27 can be weakened and curvature of image field created in the eighth positive lens 27 can be made small.

Embodiment 3

Figure 3:
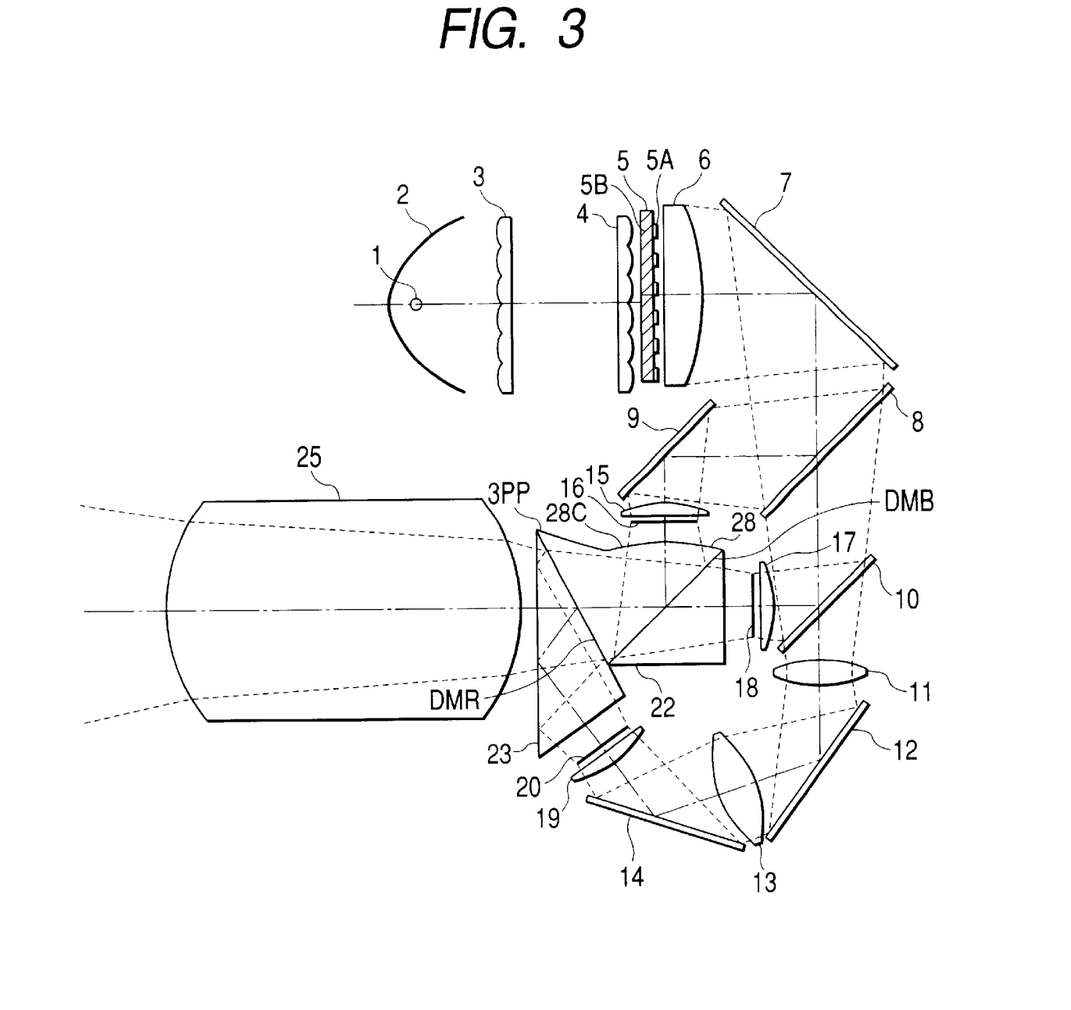
FIG. 3 is a cross-sectional view showing the construction of a projection type image display apparatus in Embodiment 3 of the present invention.

FIG. 3 is a cross-sectional view showing the construction of a projection type image display apparatus in Embodiment 3 of the present invention. This embodiment is constructed with a lens shape creating an effect similar to that of the eighth positive lens 27 disposed between the blue image modulating means 16 and the color combining prism 4PP in Embodiment 2 being formed on the incidence surface 28C of a prism 28. If polishing is not done and the prism is manufactured by molding, such a shape also becomes possible. As compared with Embodiment 1, the present embodiment has the advantage that the number of parts can be reduced. Also, as compared with Embodiment 1, the positive lens portion 28C of the prism 28 can be kept away from the blue image modulating means 16 and therefore, the power of the positive lens portion 28C can be weakened, and curvature of image field created in this positive lens portion 28C can be made small.

Embodiment 4

Figure 5:
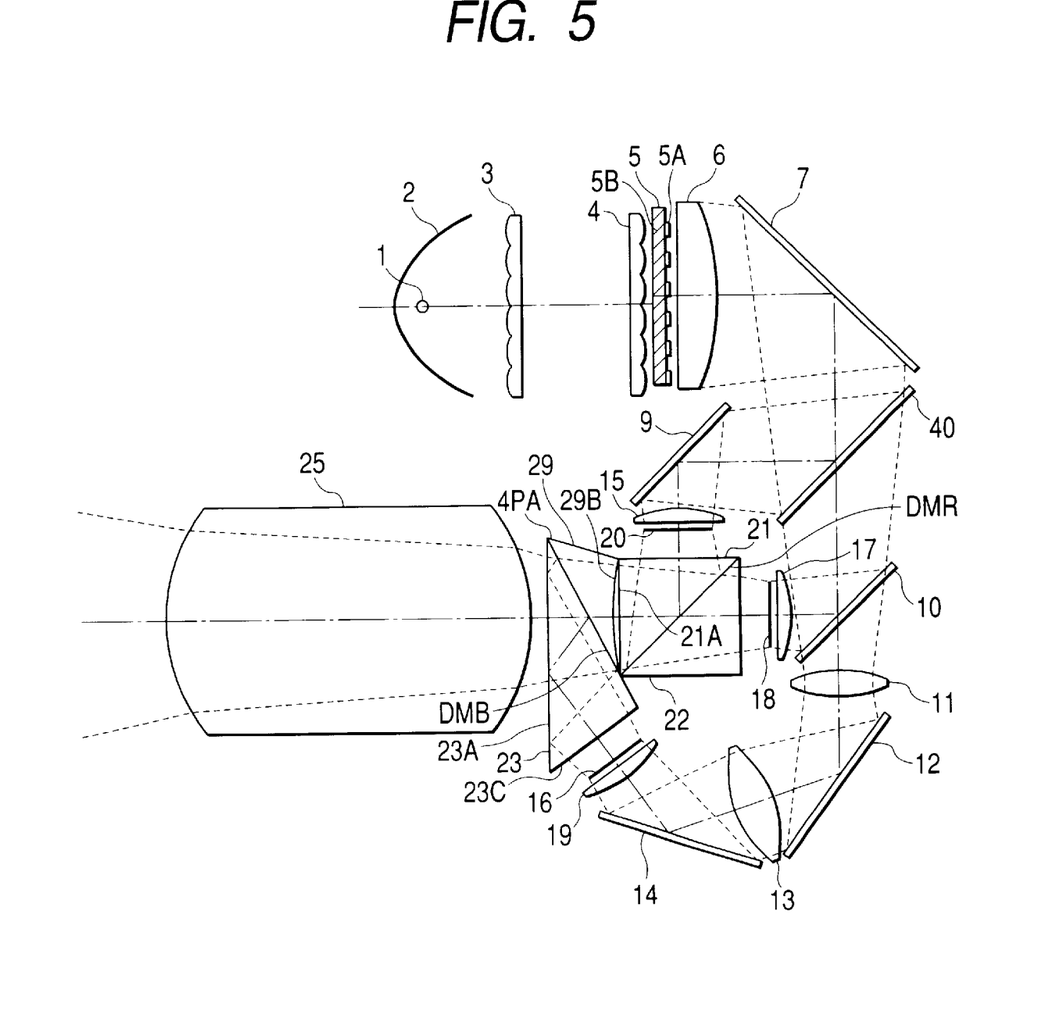
FIG. 5 is a cross-sectional view showing the construction of a projection type image display apparatus in Embodiment 4 of the present invention.

FIG. 5 is a cross-sectional view showing the construction of a projection type image display apparatus in Embodiment 4 of the present invention. This embodiment is constructed with a lens shape having negative refractive power in a color combining prism 4PA being formed on the incidence surface 29B of a prism 29. In the present embodiment, a lens portion 29B for correcting chromatic aberration of magnification is disposed in the interior of the color combining means and therefore, in a certain color channel and two other color channels, the combined focal length of the projection system can be made different. The chromatic aberration of magnification of an ordinary projection lens is greatest for blue and therefore, in the case of the present embodiment, the blue image modulating means 16 is disposed in opposed relationship with the incidence surface 23C of the prism 23 most adjacent to the exit side. Consequently, in a color separating optical system, the blue reflecting dichroic mirror 8 in Embodiments 1 to 3 is replaced by a red reflecting dichroic mirror 40.

Also, the blue reflecting dichroic mirror layer of the color combining prism is formed on a surface DMB, and the red reflecting dichroic mirror layer thereof is formed on a surface DMR.

Comparing the present embodiment with Embodiment 1 and Embodiment 2, it has the advantage that the number of parts can be reduced. Also, as compared with Embodiments 1 and 2, the lens portion 29B for correcting chromatic aberration of magnification can be considerably kept away from the green image modulating means 18 and the red image modulating means 20 and therefore, the power of this lens portion 29B can be weakened, and curvature of image field created by this lens portion 29B can be made still smaller. The space between the lens portion 29B of the prism 29 and the exit surface 21A of the prism 21 may be air or an adhesive agent differing in refractive index from the glass forming this prism.

Generally a projection lens is greatest in the chromatic aberration of magnification of blue, and the projected image becomes small on the screen and therefore, in the case of this embodiment, the blue image modulating means 16 is disposed at a location opposed to the incidence surface the prism most adjacent to the exit side of the color combining prism. The combined focal length of the projection system in the optical paths of the green and red channels can be made great by the lens portion 29B with negative refractive power in the prism 29 and therefore, the projected images of the green image modulating means 18 and the red image modulating means 20 on the screen become small, and the sizes of the green and red projected images can be made coincident with the size of the projected image of the blue image modulating means 16. Consequently, as in Embodiments 1 to 3, the chromatic aberration of magnification of the projection lens 25 can be corrected by the color combining prism.

Embodiment 5

Figure 6:
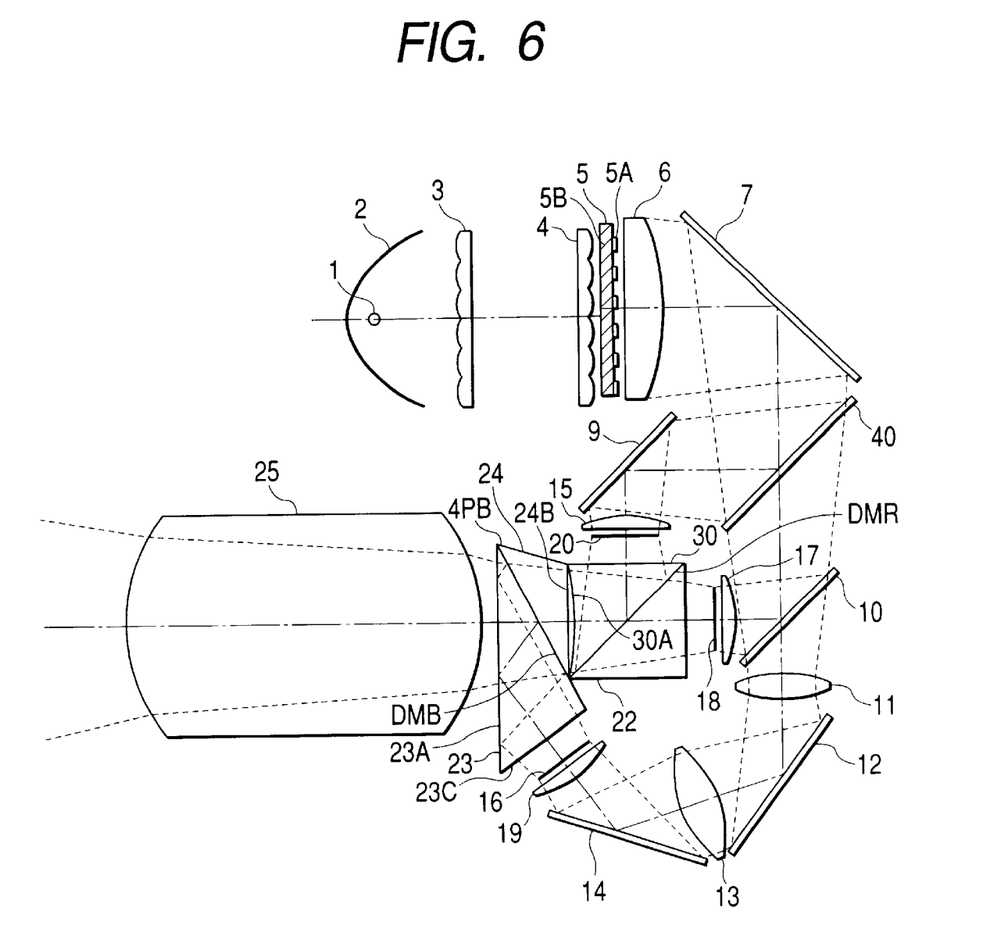
FIG. 6 is a cross-sectional view showing the construction of a projection type image display apparatus in Embodiment 5 of the present invention.

FIG. 6 is a cross-sectional view showing the construction of a projection type image display apparatus in Embodiment 5 of the present invention. This embodiment is constructed with a lens shape having negative refractive power being formed on the exit surface 30A of a prism 30.

As in the construction of Embodiment 4 shown in FIG. 5, the blue image modulating means 16 is disposed in opposed relationship with the incidence surface 23C of the prism 23 disposed most adjacent to the exit side of a color combining prism 4PB. Again this embodiment, like Embodiment 4, as compared with Embodiment 1 and Embodiment 2, has the advantage that the number of parts can be reduced. Also, as compared with Embodiment 1 and Embodiment 2, a lens portion 30A for correcting chromatic aberration of magnification can be considerably kept away from the green image modulating means 18 and the red image modulating means 20 and therefore, the power of this lens portion 30A can be weakened and curvature of image field created by this lens portion 30A can be made still smaller. The space between the lens portion 30A of the prism 30 and the incidence surface 24B of the prism 24 may be air or an adhesive agent differing in refractive index from the glass forming this prism.

Numerical Value Embodiments

Figure 7:
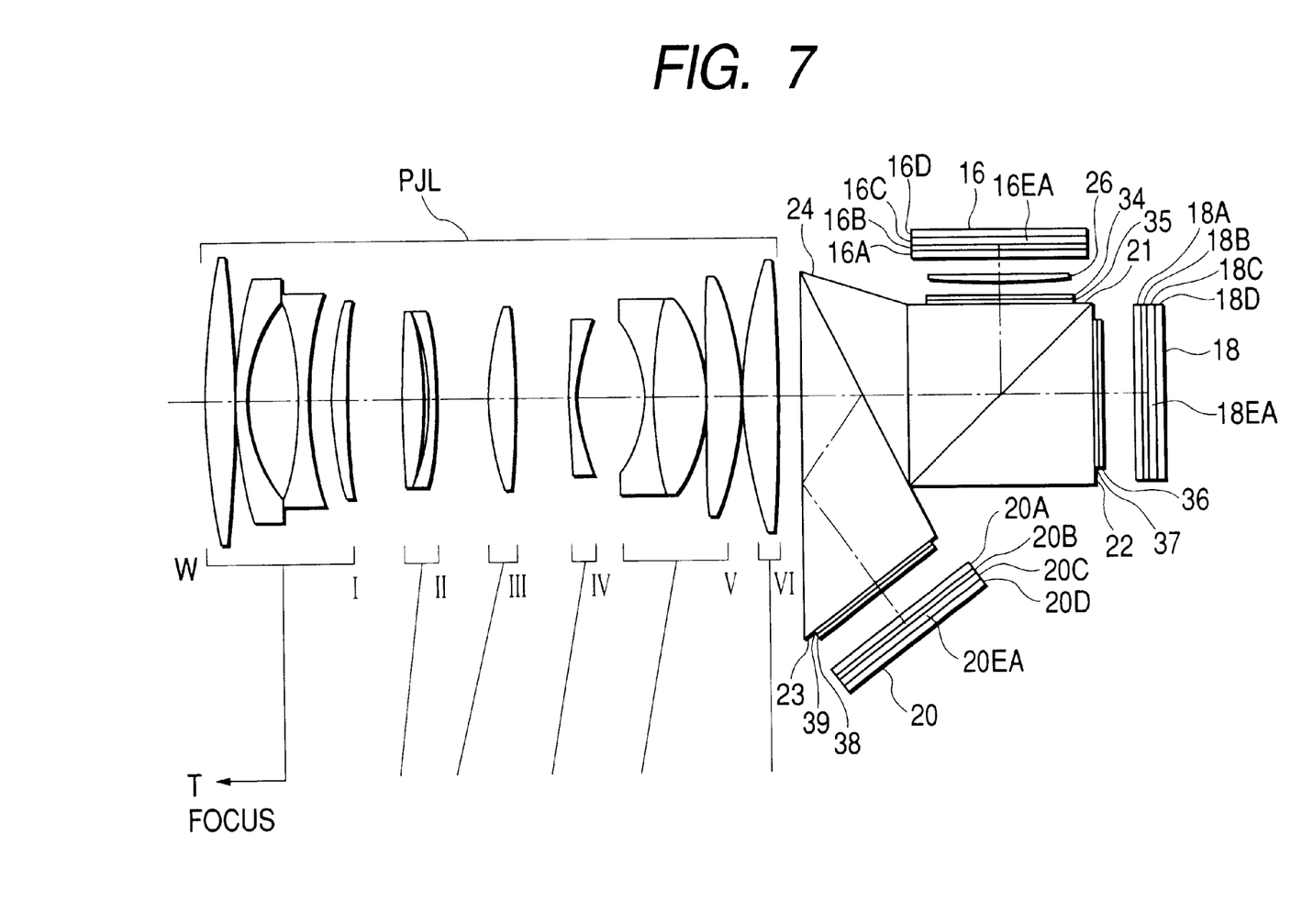
FIG. 7 is a cross-sectional view of the color combining projection optical system of Numerical Value Embodiment 1 in Embodiment 1 of the present invention.

FIG. 7 shows a cross-sectional view of Numerical Value Embodiments 1 of the construction of Embodiment 1.

A projection lens PJL comprises, in succession from the screen side, a first lens unit I of negative refractive power, a second lens unit II of positive refractive power, a third lens unit III of positive refractive power, a fourth lens unit IV of negative refractive power, a fifth lens unit V of positive refractive power and a sixth lens unit VI of positive refractive power, and in case of the focal length change from the wide angle end to the telephoto end, the first lens unit and the sixth lens unit are stationary relative to the image modulating means 16, 18 and 20, and the second, third, fourth and fifth lens units are moved from the image modulating means side to the screen side, thereby effecting zooming operation and the correction of the image plane position and the correction of aberration fluctuations resulting from the zooming operation. By the projection lens PJL being of a six-unit construction, the degree of freedom of design is increased, and as compared with a conventional projection lens, the shortening of the entire length of the lens becomes possible.

A sapphire substrate or a glass plate 35 having an exit side polarizing plate 34 cemented thereto is further cemented to the incidence surface of the prism 21 to thereby make the heat radiation of this polarizing plate good. Symbol 16EA of the image modulating means 16 indicates the image display range. Reference characters 16A, 16B, 16C and 16D designate the substrate glass and dust proof glass of liquid crystal. A seventh positive lens 26 for correcting the chromatic aberration of magnification of the projection lens PJL has its color combining prism side made into a convex surface in order to keep a surface having refractive power away from the display portion of the image modulating means as much as possible. In the construction of FIG. 7, in order to enable the cooling of the image modulating means 16 and the polarizing plate 34 to be sufficiently done, the seventh positive lens is disposed substantially at the center between the image modulating means 16 and the color combining prism so that a cooling wind produced from a fan, not shown, may pass well.

Figure 8:
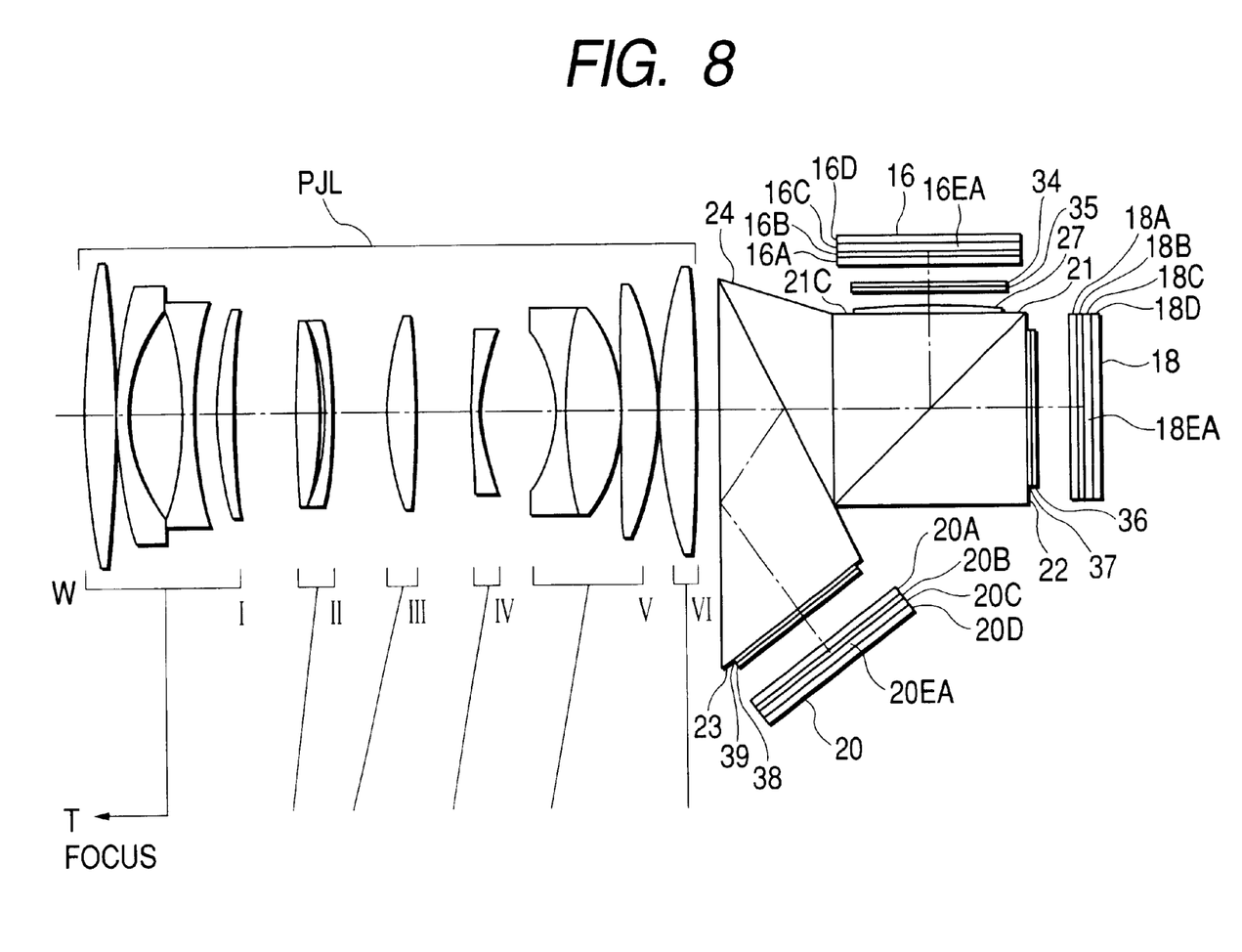
FIG. 8 is a cross-sectional view of the color combining projection optical system of Numerical Value Embodiment 2 in Embodiment 2 of the present invention.

FIG. 8 shows a cross-sectional view of Numerical Value Embodiment 2 of the construction of Embodiment 2.

The construction of the projection lens PJL is entirely the same as that of Numerical Value Embodiment 1 shown in FIG. 7.

An eighth positive lens 27 for correcting the chromatic aberration of magnification of blue of the projection lens PJL is cemented to the incidence surface 21C of a prism 21. Therefore, the exit side polarizing plate 34 and a sapphire substrate or glass plate 35 for radiation is disposed at the substantially intermediate position between the color combining prism and the image modulating means 16. By adopting such a construction, the spacing between the exit side polarizing plate 34 and the image modulating means 16 is sufficiently secured, and it becomes possible to let a cooling wind produced from a fan, not shown, flow and therefore, cooling can be effected well.

Also, as previously described, the correction lens 27 for the correction of chromatic aberration of magnification can be kept away from the image modulating means and therefore, the power of the correction lens weakens and the occurrence of curvature of image field can be made small.

Figure 9:
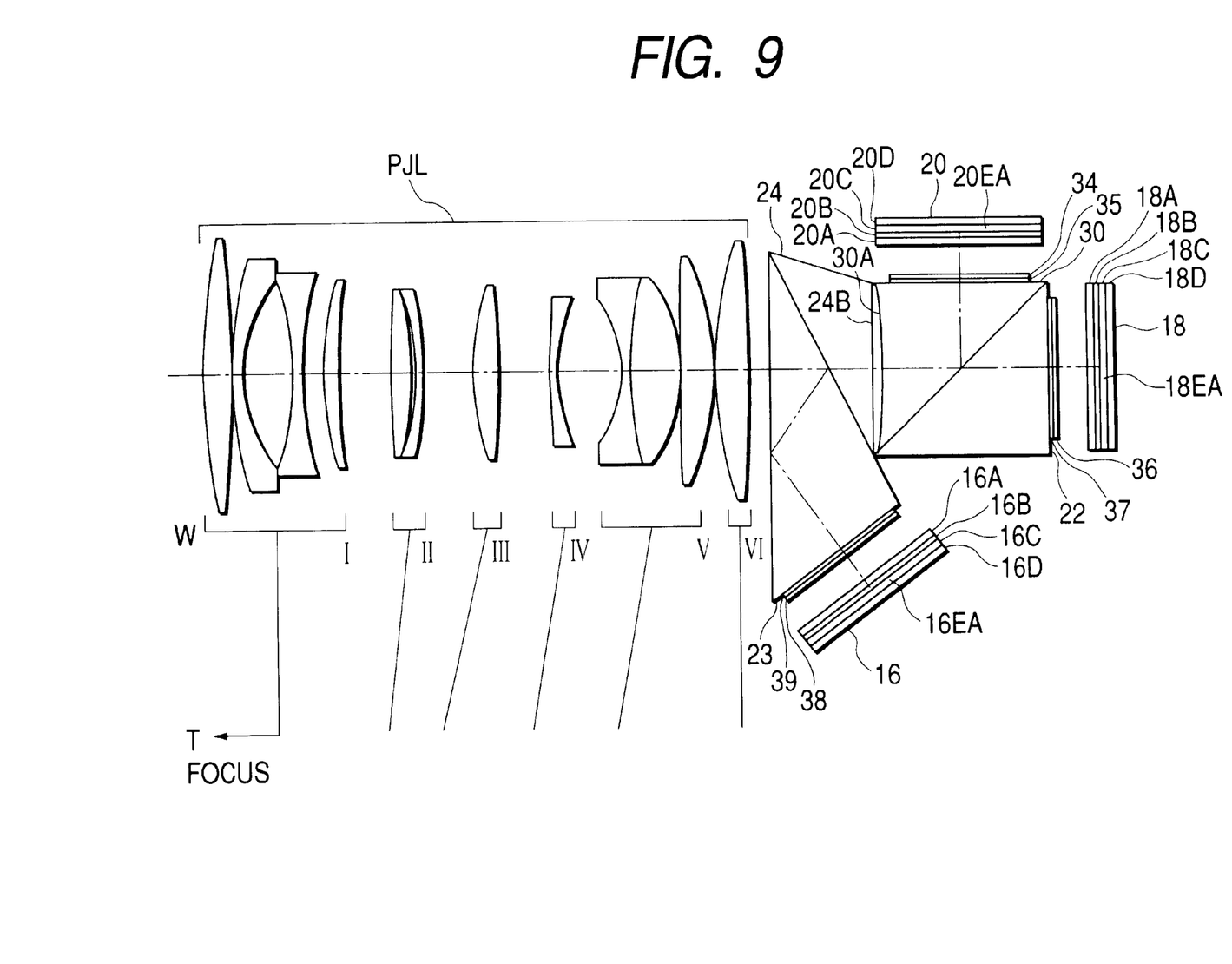
FIG. 9 is a cross-sectional view of the color combining projection optical system of Numerical Value Embodiment 3 in Embodiment 3 of the present invention.

FIG. 9 shows a cross-sectional view of Numerical Value Embodiment 3 similar in construction to Embodiment 5 of the present invention.

The construction of the projection lens PJL is entirely the same as that of Numerical Value Embodiment 1 shown in FIG. 7.

In this embodiment, a concave surface is formed on the exit surface 30A of a prism 30 so that the combined focal length of the projection optical systems of the green and red channels may become great in order that the sizes of red, green and blue projected images may become coincident with one another on the screen, not shown. In this case, it becomes possible to keep the magnification color correcting lens portion 30A considerably away from the image modulating means 18 and 20, as compared with Numerical Value Embodiments 1 and 2, and therefore it becomes possible to further weaken the power of the correction lens portion 30A, and it becomes possible to make curvature of image field created by the correction lens portion 30A very small.

Lastly, the meanings of the following conditional expressions (i) to (iv) satisfied by the present embodiments will be explained in below.

The following conditional expression (i) is satisfied;

$$0.03 < L/bf < 0.3 \qquad (i)$$

where L expresses the air-converted interval between the display portion of the light modulating means and the principal point of the optical element having positive or negative refractive power, and bf expresses the back focal length of the projecting means on the reduction conjugate side thereof when the conjugate length of said projecting means on the enlargement conjugate side thereof is infinity.

Conditional expression (i) restricts the ratio between the air-converted interval between the display portion of the image modulating means and the optical element and the back focal length of the reduction conjugate side of the projecting means when the conjugate length of the enlargement conjugate side is infinity, and in the area below the lower limit value of conditional expression (i), the optical element becomes too close to the display portion of the image modulating means and therefore, the power of the optical element for magnification color correction must be made considerably strong, and curvature of image field comes to occur greatly, and this is not preferable.

In the area exceeding the upper limit value of conditional expression (i), the distance between the optical element and the incidence surface of the color combining means must be made greater than necessary and as the result, the back focal length of the projecting means becomes longer than necessary, and this is not preferable. When the back focal length of the projecting means becomes long, the projecting means becomes bulky, and this is not preferable.

The following conditional expression (ii) is satisfied;

$$|fw/fc|<0.03 \qquad (ii),$$

where fw expresses the focal length of the projecting means and fc expresses the focal length of the optical element.

Conditional expression (ii) restricts the ratio between the focal length of the projecting means and the focal length of the optical element, and in the area exceeding the upper limit value of conditional expression (ii), curvature of image field occurs greatly due to the optical element, and this is not preferable.

The following conditional expression (iii) is preferably satisfied;

$$0.45<L/bf<0.8 \qquad (iii),$$

where L expresses the air-converted interval between the display portion of the image modulating means and the principal point of the optical element, and bf expresses the back focal length of the projecting means on the reduction conjugate side thereof when the conjugate length of said projecting means on the enlargement conjugate side thereof is infinity.

Conditional expression (iii) restricts the ratio between the air-converted interval between the display portion of the image modulating means and the optical element and the back focal length of the reduction conjugate side of the projecting means when the conjugate length of the enlargement conjugate side is infinity, and in the area below the lower limit value of conditional expression (iii), the optical element portion becomes too close to the display portion of the image modulating means and therefore, the space constituting two color combining prisms on the incidence side cannot be secured sufficiently, and this is not preferable.

In the area exceeding the upper limit value of conditional expression (iii), the distance between the optical element portion and the display portion of the image modulating means must be made greater than necessary and as the result, the space constituting two color combining prisms on the exit side of the color combining means cannot be secured sufficiently, and this is not preferable.

The following conditional expression (iv) is preferably satisfied;

$$|fw/fc|<0.015 \qquad (iv),$$

where fw expresses the focal length of the projecting means and fc expresses the focal length of the optical element.

Conditional expression (iv) restricts the ratio between the focal length of the projecting means and the focal length of the optical element, and in the area exceeding the upper limit value of conditional expression (iv), the correction of chromatic aberration of magnification by the optical element becomes excessive, and this is not preferable.

The values of the aforedescribed conditional expressions (i) to (iv) in the above-described Numerical Value Embodiments 1 to 3 will be shown below.

|  | Numerical Embodiment 1 | Numerical Embodiment 2 | Numerical Embodiment 3 |
| --- | --- | --- | --- |
| Conditional Expression (i) | 0.1135 | 0.1700 |  |
| Conditional Expression (ii) | 0.0060 | 0.0040 |  |
| Conditional Expression (iii) |  |  | 0.6290 |
| Conditional Expression (iv) |  |  | 0.0011 |

Figures 10A, 10B:
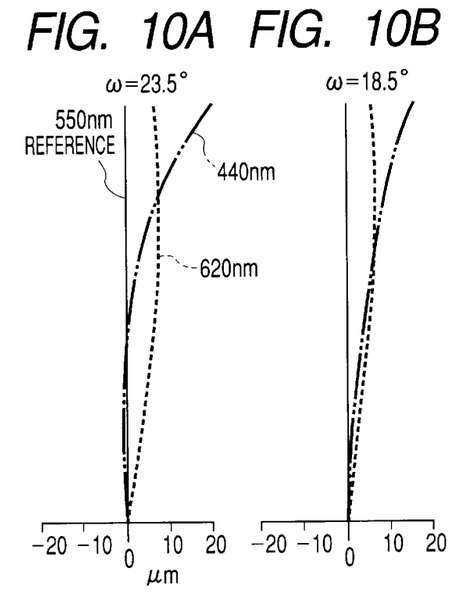
FIG. 10A shows the chromatic aberration of magnification of the wide angle end of the color combining projection optical system when the magnification color correcting means of Numerical Value Embodiment 1 is not used.
FIG. 10B shows the chromatic aberration of magnification of the telephoto end of the color combining projection optical system when the magnification color correcting means of Numerical Value Embodiment 1 is not used.

FIG. 10A shows the chromatic aberration of magnification of the wide angle end of the color combining projection optical system when it uses the projection lens of Numerical Value Embodiment 1 and does not use a magnification color correction lens. With the green of 500 nm as a reference, there are shown the chromatic aberrations of magnification of the blue of 440 nm (dots-and-dash line) and the red of 620 nm (dotted line).

Also, FIG. 10B shows the chromatic aberration of magnification of the telephoto end of the color combining projection optical system when it uses the projection lens of Numerical Value Embodiment 1 and does not use the magnification color correction lens.

As shown in FIGS. 10A and 10B, chromatic aberration of magnification occurs greatly for blue around the image field, and assuming that the resolution of a liquid crystal panel used in the image modulating means of the present invention is XGA (1024×768), the size of a pixel is 14 $\mu$m in liquid crystal of 0.7 inch, and in the outermost periphery of the wide angle end, the chromatic aberration of magnification greatly exceeds a pixel and is of the order of 20 $\mu$m, and the color misregistration of the projected image is conspicuous and the resolution becomes lower.

Figure 10C:
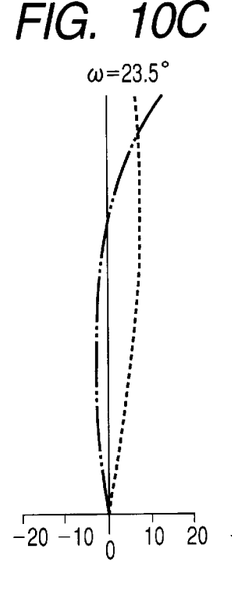
FIG. 10C shows the chromatic aberration of magnification of the wide angle end of the color combining projection optical system of Numerical Value Embodiment 1.

Also, FIG. 10C shows the chromatic aberration of magnification of the color combining projection optical system at the wide angle end of Numerical Value Embodiment 1.

Figure 10D:
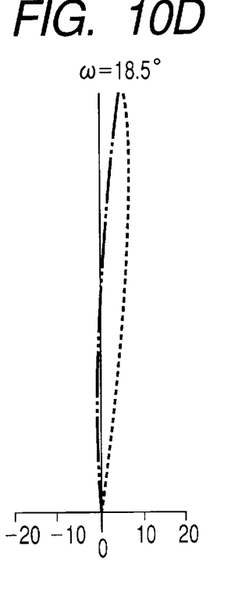
FIG. 10D shows the chromatic aberration of magnification of the telephoto end of the color combining projection optical system of Numerical Value Embodiment 1.

Also, FIG. 10D shows the chromatic aberration of magnification of the color combining projection optical system at the telephoto end of Numerical Value Embodiment 1.

As shown in FIGS. 10C and 10D, the chromatic aberration of magnification for blue decreases greatly, and again in the outermost periphery of the image field, chromatic aberration of magnification could be made equal to or less than a pixel (14 $\mu$m).

Figure 10E:
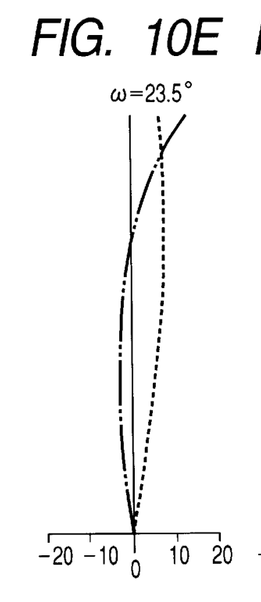
FIG. 10E shows the chromatic aberration of magnification of the wide angle end of the color combining projection optical system of Numerical Value Embodiment 2.

FIG. 10E shows the chromatic aberration of magnification of the color combining projection optical system at the wide angle end of Numerical Value Embodiment 2.

Figure 10F:
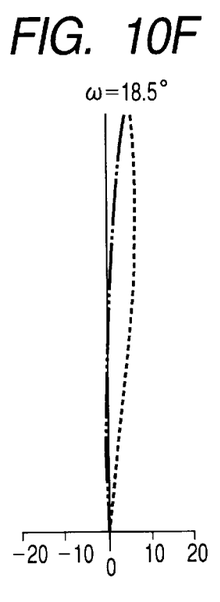
FIG. 10F shows the chromatic aberration of magnification of the telephoto end of the color combining projection optical system of Numerical Value Embodiment 2.

Also, FIG. 10F shows the chromatic aberration of magnification of the color combining projection optical system at the telephoto end of Numerical Value Embodiment 2.

As in Numerical Value Embodiment 1, the occurrence of chromatic aberration of magnification is suppressed to a small value. The radius of curvature of the magnification color correction lens is about 1.5 times longer than that in Numerical Value embodiment 1, and therefore the occurrence of curvature of image field is suppressed to a small value.

Figure 10G:
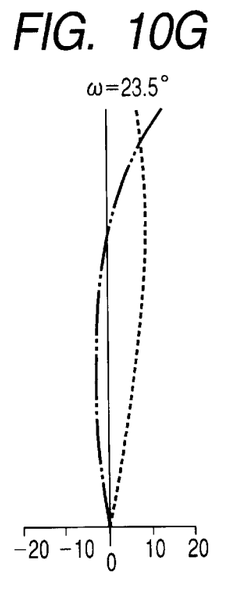
FIG. 10G shows the chromatic aberration of magnification of the wide angle end of the color combining projection optical system of Numerical Value Embodiment 3.

FIG. 10G shows the chromatic aberration of magnification of the color combining projection optical system at the wide angle end of Numerical Value Embodiment 3.

Figure 10H:
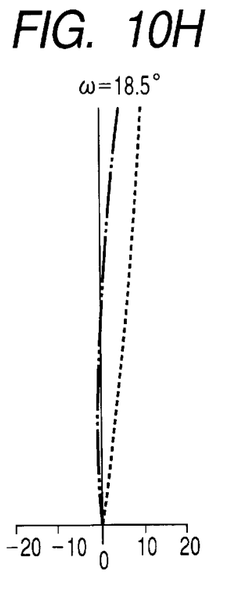
FIG. 10H shows the chromatic aberration of magnification of the telephoto end of the color combining projection optical system of Numerical Value Embodiment 3.

Also, FIG. 10H shows the chromatic aberration of magnification of the color combining projection optical system at the telephoto end of Numerical Value Embodiment 3.

As in Numerical Value Embodiment 1, the occurrence of chromatic aberration of magnification is suppressed to a small value. The radius of curvature of the magnification color correction lens is about 6.5 times longer than that in Numerical Value Embodiment 1, and therefore the occurrence of curvature of image field is suppressed to a very small value.

As described above, according to the present embodiment, there can be provided a color combining optical system and a projection type display apparatus in which the deformation of the projected image of each color is null or smaller than in the prior art.

What is claimed is:

1. A color combining optical system comprising:

at least three prisms;

two dichroic mirror layers for reflecting lights differing in wavelength area from each other, said two dichroic mirror layers being formed so as not to intersect with each other with the prism adjacent to one of said three prisms which is located most adjacent to the light exit side interposed between said two dichroic mirror layers; and at least one optical element having positive or negative refractive power, said optical element receiving light from at least one of a plurality of light modulating elements, and causing the light to enter one of said at least three prisms;

wherein the light exit surface of said prism located most adjacent to the light exit side serves also as a total reflection surface for reflecting the light to one of said two dichroic mirror layers.

2. A projection type display apparatus comprising:

a plurality of light modulating means for modulating a plurality of color lights differing in wavelength area from one another;

color combining means according to claim 1 for combining the plurality of color lights modulated by said light modulating means; and projecting means for enlarging and projecting the lights combined by said color combining means.

3. A projection type display apparatus according to claim 2, wherein said optical element having positive or negative refractive power is disposed between at least blue light modulating means of said plurality of light modulating means and said color combining optical system.

4. A projection type display apparatus according to claim 2, wherein the following conditional expression is satisfied:

$0.03 < L/bf < 0.3$, where L: the air-converted interval between the display portion of the light modulating means and the principal point of the optical element having positive or negative refractive power;

bf: the back focal length of the projecting means on the reduction conjugate side thereof when the conjugate length of said projecting means on the enlargement conjugate side thereof is infinity.

5. A projection type display apparatus according to claim 2, wherein the following conditional expression is satisfied:

$|fw/fc| < 0.03$, where fw: the focal length of said projecting means;

fc: the focal length of said optical element.

6. A color combining optical system comprising:

at least three prisms; and two dichroic mirror layers for reflecting lights differing in wavelength area from each other, said two dichroic mirror layers being formed so as not to intersect with each other with the prism adjacent to one of said three prisms which is located most adjacent to the light exit side interposed between said two dichroic mirror layers;

wherein the light exit surface of said prism located most adjacent to the light exit side serves also as a total reflection surface for reflecting light to one of said two dichroic mirror layers, and at least one of the light incidence surfaces of said three prisms has positive or negative refractive power.

7. A projection type display apparatus comprising:

a plurality of light modulating means for modulating a plurality of color lights differing in wavelength area from one another;

color combining means according to claim 6 for combining the plurality of color lights modulated by said light modulating means; and projecting means for enlarging and projecting the lights combined by said color combining means.

8. A color combining optical system comprising:

at least three prisms; and two dichroic mirror layers for reflecting lights differing in wavelength area from each other, said two dichroic mirror layers being formed so as not to intersect with each other with the prism adjacent to one of said three prisms which is located most adjacent to the light exit side interposed between said two dichroic mirror layers;

wherein the light exit surface of said prism located most adjacent to the light exit side serves also as a total reflection surface for reflecting light to one of said two dichroic mirror layers, and said at least three prisms have therein an area having positive or negative refractive power.

9. A projection type display apparatus comprising:

a plurality of light modulating means for modulating a plurality of color lights differing in wavelength area from one another;

color combining means according to claim 8 for combining the plurality of color lights modulated by said light modulating means; and projecting means for enlarging and projecting the lights combined by said color combining means.

10. A projection type display apparatus according to claim 9, wherein blue light modulating means of said plurality of light modulating means is disposed in opposed relationship with the light incidence side of said prism located most adjacent to the light exit side.

11. A projection type display apparatus according to claim 9, wherein the following conditional expression is satisfied:

$$0.45 < L/bf < 0.8,$$

where L: the air-converted interval between the display portion of the light modulating means and the principal point of said optical element;
bf: the back focal length of said projecting means on the reduction conjugate side thereof when the conjugate length of said projecting means on the enlargement conjugate side thereof is infinity.

12. A projection type display apparatus according to claim 9, wherein the following conditional expression is satisfied:

$$|fw/fc| < 0.015,$$

where fw: the focal length of said projecting means;
fc: the focal length of said optical element.

13. A color combining optical system comprising:
at least four prisms;
two dichroic mirror layers for reflecting lights differing in wavelength area from each other, said dichroic mirror layers being formed so as not to intersect with each other with a set of prisms adjacent to one of said four prisms which is located most adjacent to the light exit side interposed between said two dichroic mirror layers; and
an optical element having positive or negative refractive power, said optical element receiving light from at least one of a plurality of light modulating means, and causing the light to enter one of said at least four prisms;
wherein the light exit surface of said prism located most adjacent to the light exit side serves also as a total reflection surface for reflecting the light to one of said two dichroic mirror layers.

14. An optical system according to claim 13, wherein on the premise that one of said four prisms which is located most adjacent to the light exit side is the first prism, said set of prisms are the second and third prisms as counted from the light exit side.

15. An optical system according to claim 13, wherein on the premise that one of said four prisms which is located most adjacent to the light exit side is the first prism, a first dichroic mirror layer for reflecting a first color light is formed between the first and second prisms as counted from the light exit side, and a second dichroic mirror layer for reflecting a second color light is formed between the third and fourth prisms as counted from the light exit side.

16. A projection type display apparatus comprising:
a plurality of light modulating means for modulating a plurality of color lights differing in wavelength area from one another;
color combining means according to claim 13 for combining the plurality of color lights modulated by said light modulating means; and
projecting means for enlarging and projecting the lights combined by said color combining means.

17. A color combining optical system comprising:
at least four prisms; and
two dichroic mirror layers for reflecting lights differing in wavelength area from each other, said dichroic mirror layers being formed so as not to intersect with each other with a set of prisms adjacent to one of said four prisms which is located most adjacent to the light exit side interposed between said two dichroic mirror layers;

wherein the light exit surface of said prism located most adjacent to the light exit side serves also as a total reflection surface for reflecting the light to one of said two dichroic mirror layers, and at least one of the light incidence surfaces of said at least four prisms has positive or negative refractive power.

18. An optical system according to claim 17, wherein on the premises that one of said four prisms which is located most adjacent to the light exit side is the first prism, said set of prisms are the second and third prisms as counted from the light exit side.

19. An optical system according to claim 17, wherein on the premise that one of said four prisms which is located most adjacent to the light exit side is the first prism, a first dichroic mirror layer for reflecting a first color light is formed between the first and second prisms as counted from the light exit side, and a second dichroic mirror layer for reflecting a second color light is formed between the third and fourth prisms as counted from the light exit side.

20. A light combining optical system comprising:
at least four prisms; and
two dichroic mirror layers for reflecting lights differing in wavelength area from each other, said two dichroic mirror layers being formed so as not to intersect with each other with a set of prisms adjacent to one of said four prisms which is located most adjacent to the light exit side interposed between said two dichroic mirror layers;
wherein the light exit surface of said prism located most adjacent to the light exit side serves also as a total reflection surface for reflecting the light to one of said two dichroic mirror layers, and said at least four prisms have therein an area having positive or negative refractive power.

21. An optical system according to claim 20, wherein on the premise that one of said four prisms which is located most adjacent to the light exit side is the first prism, the second and third prisms as counted from the light exit side have positive or negative power therebetween.

22. An optical system according to claim 20, wherein on the premise that one of said four prisms which is located most adjacent to the light exit side is the first prism, there is an optical element having positive or negative refractive power on the light incidence side of the second prism as counted from the light exit side.

23. An optical system according to claim 20, wherein on the premise that one of said four prisms which is located most adjacent to the light exit side is the first prism, there is an optical element having positive or negative refractive power on the light exit side of the third prism as counted from the light exit side.

24. An optical system according to claim 20, wherein on the premise that one of said four prisms which is located most adjacent to the light exit side is the first prism, said set of prisms are the second and third prisms as counted from the light exit side.

25. An optical system according to claim 20, wherein on the premise that one of said four prisms which is located most adjacent to the light exit side is the first prism, a first dichroic mirror layer for reflecting a first color light is formed between the first and second prisms as counted from the light exit side, and a second dichroic mirror layer for reflecting a second color light is formed between the third and fourth prisms as counted from the light exit side.

26. A projection type display apparatus comprising:

a plurality of light modulating means for modulating a plurality of color lights differing in wavelength area from one another;

color combining means according to claim 20 for combining the plurality of color lights modulated by said light modulating means; and projecting means for enlarging and projecting the lights combined by said color combining means.

* * * * *